2,847,452
STABILIZATION OF UNSATURATED NITRILES

Fred Applegath and Raymond A. Franz, El Dorado, Ark., assignors to Monsanto Chemical Company, St. Louis, Mo., a corporation of Delaware No Drawing. Application October 8, 1956
Serial No. 614,338

7 Claims. (Cl. 260—465.9)

This invention relates to the stabilization of unsaturated nitriles. More specifically, this invention relates to the inhibition of the polymerization of alpha,beta-unsaturated nitriles.

The unsaturated nitriles, particularly the alpha,beta-unsaturated nitriles, are extremely useful chemical compounds. Considerable quantities of these materials are used for the preparation of synthetic rubbers and various types of synthetic resins. These materials, however, possess a characteristic which all too frequently hampers not only their utility, but also the purification techniques commonly employed in their preparation. All of these materials exhibit a tendency to polymerize when subjected to periods of storage and/or to elevated temperatures. Such polymerization results in a darkening of the unsaturated nitrile monomer and ultimately in the formation of solid polymer contaminant.

Since most applications or uses of the unsaturated nitriles require high-purity products, these polymerization characteristics present a serious problem in the preparation and storage of finished grade material. Furthermore, since distillation at elevated temperatures is the commonly used purification technique, purification is hampered by solid polymer formation which accumulates in the equipment, ultimately plugging the system. To add to this latter problem, impurities present in crude unsaturated nitriles are frequently of the type which accelerate polymerization.

Attempts to eliminate this problem have been made in the past by the addition of inhibitors which retard or prevent the polymerization of unsaturated nitriles. Unfortunately, the inhibitors heretofore used, while exhibiting some inhibitory effects, have not proven to be completely satisfactory. To be of practical utility, the inhibitor must not impart any undesirable color to the unsaturated nitrile, must be sufficiently inhibitory to manifest its effect over extended periods of storage, must inhibit polymer formation at elevated temperatures to permit utility in distillation purification techniques, and must be readily separable from the unsaturated nitrile or inert in subsequent reactions of the inhibited product. The inhibitors heretofore used have not satisfied all of these requirements.

It is an object of this invention to provide an improved method for preventing or inhibiting the polymerization of unsaturated nitriles. It is a further object of this invention to provide an improved method for preventing the polymerization of unsaturated nitriles by the addition of an inhibitor which does not possess the deficiencies exhibited by the inhibitors heretofore used. A still further object of this invention is to provide novel stabilized compositions comprising an unsaturated nitrile and an added polymerization inhibitor, which then can be subjected to extended periods of storage or distillation at elevated temperatures without exhibiting any significant evidence of polymer formation. Further objects of this invention will become apparent from the description which follows.

It has been discovered that polymerization of unsaturated nitriles, particularly the alpha,beta-unsaturated nitriles, can be greatly inhibited by mixing therewith a minor amount of a dialkyl amine or trialkyl amine together with a minor amount of acetaldehyde. It has been found that an unsaturated nitrile stabilized with such a mixture of a dialkyl amine or trialkyl amine with acetaldehyde exhibits significantly greater inhibition toward polymerization than unsaturated nitriles stabilized with either the amine or the acetaldehyde alone. In this sense this mixture of inhibitors exhibits a synergistic inhibiting effect upon unsaturated nitriles. Unsaturated nitriles so inhibited will not exhibit any significant polymer formation on prolonged periods of storage or when subjected to temperatures commonly encountered during purification by distillation techniques.

In order to show the effectiveness of this mixture of amines and acetaldehyde as inhibitors for unsaturated nitriles, tests were carried out in which acrylonitrile containing these inhibitors was subjected to the oxygen bomb test, which is conventionally employed for determining the stability of gasoline in the presence of oxygen at high pressures. The oxygen bomb test as used was as follows:

Using a graduated cylinder, 25 ml. of acrylonitrile containing the mixture of inhibitors was measured into the glass liner. The liner was placed in a stainless steel bomb connected to a pressure recording gauge and the bomb tightly closed. Oxygen was added to the bomb to a pressure of 100 p. s. i. at room temperature. The bomb was placed in the steam bath and the pressure characteristics noted. As the bomb became heated, the pressure rose gradually to about 140 p. s. i. If the sample was unstable and polymerized, the pressure, after levelling off, dropped and then increased rapidly with the formation of yellow solid polymer. The time lapse for the sample to begin polymerization was used as an indication of the stability of the material.

EXAMPLE 1

Using the procedure set forth above acrylonitrile stabilized with dialkyl amines or trialkyl amines and acetaldehyde was evaluated and the results obtained are set forth in Table 1.

Table 1

| Inhibitor System | Time to Polymerization, hours |
|---|---|
| None | 1¼ |
| 100 p. p. m.[1] acetaldehyde | 1¼ |
| 100 p. p. m. tri-n-butylamine | 3 |
| 50 p. p. m. tri-n-butylamine +50 p. p. m. acetaldehyde | 5 |
| 100 p. p. m. di-iso-propylamine | 2½ |
| 100 p. p. m. di-iso-propylamine +20 p. p. m. acetaldehyde | 2¾ |
| 100 p. p. m. di-iso-propylamine +50 p. p. m. acetaldehyde | 6 |
| 100 p. p. m. di-iso-propylamine +100 p. p. m. acetaldehyde | 7¾ |

[1] Parts by weight per million parts by weight of acrylonitrile.

The results set forth in Table 1 above clearly show the surprising synergistic stabilizing effect of a mixture of acetaldehyde and dialkyl or trialkyl amine. Acetaldehyde per se is actually a polymerization accelerator yet in combination with dialkyl and trialkyl amine inhibitors significantly reduces the polymerizing tendencies of the unsaturated nitrile. In addition to the tri-n-butylamine and di-iso-propylamine set forth in Example 1 the following amines will exhibit a comparable effect:

Dimethylamine
Diethylamine
Di-n-propyamine
Di-iso-butylamine
Di-n-amylamine

Di-n-hexylamine
Di-2-ethylbutylamine
Di-n-heptylamine
Di-n-octylamine
Di-2-ethylhexylamine Trimethylamine
Triethylamine
Tri-n-propylamine
Tri-iso-butylamine
Tri-n-amylamine
Tri-n-hexylamine Tri-2-methylamylamine
Tri-2-ethylbutylamine
Tri-n-heptylamine
Tri-n-octylamine
Tri-2-ethylhexylamine

EXAMPLE 2

Samples of acrylonitrile, methacrylonitrile, crotononitrile, alpha-ethylacrylonitrile, beta-hexylacrylonitrile, alpha, beta-dimethylacrylonitrile, alpha-furfurylacrylonitrile, beta-butylacrylonitrile, beta-(2-chloroethyl)acrylonitrile, beta-ethylacrylonitrile, alpha-naphthylacrylonitrile, alpha-(2-chlorobutyl)acrylonitrile and alpha-(4-hydroxyphenyl) acrylonitrile are stabilized by mixing therewith 100 parts by weight of diethylamine and 50 parts by weight of acetaldehyde per million parts of the nitrile. After extended periods of storage at atmospheric temperatures, no significant discoloration or polymer formation is evident in these samples.

EXAMPLE 3

Samples of acrylonitrile, methacrylonitrile, crotononitrile, alpha-ethylacrylonitrile, beta-hexylacrylonitrile, alpha-beta-dimethylacrylonitrile, alpha-furfurylacrylonitrile, beta-butylacrylonitrile, beta-(2-chloroethyl)acrylonitrile, beta-ethylacrylonitrile, alpha-naphthylacrylonitrile, alpha-(2-chlorobutyl)acrylonitrile and alpha-(4-hydroxyphenyl) acrylonitrile are stabilized by mixing therewith 100 parts by weight of triethylamine and 50 parts by weight of acetaldehyde per million parts of the nitrile. After extended periods of storage at atmospheric temperatures, no significant discoloration or polymer formation is evident in these samples.

While the preceding examples have illustrated specific embodiments of this invention, obviously substantial variation is possible without departing from the scope thereof. For example, the quantity of the trialkyl or dialkyl amine used to inhibit the polymerization of the unsaturated nitrile can be varied widely, depending upon the particular nitrile to be stabilized and the degree of inhibition desired. In general, minor amounts of the amine are used. An advantage of these amines in such an application as this is the fact that they can be used in extremely small quantities. Concentrations in the range of from about 0.5 to about 1000 parts by weight of the dialkyl or trialkyl amine per million parts of the nitrile are highly preferred. These low concentrations afford adequate stability for most applications and greatly simplify subsequent processing of the nitrile. Higher concentrations of the amines can be used if desired, resulting in a nitrile monomer even more strongly inhibited against polymerization.

The quantity of acetaldehyde used in conjunction with the above mentioned amines to inhibit the polymerization of the unsaturated nitrile can also be varied widely. In general, from about 10 to about 1000 parts by weight of acetaldehyde per million parts of the nitrile are used with from about 50 to about 100 parts by weight of the acetaldehyde per million parts of the nitrile being preferred. Usually at least 10 parts of acetaldehyde per million parts of the nitrile are necessary before the synergistic effect disclosed herein is manifested. Higher concentrations of the inhibitor can be used if desired.

Inhibitors of this invention can be used to stabilize unsaturated nitriles under many different types of conditions. Thus, they can be used to inhibit polymer formations in unsaturated nitrile during storage under atmospheric conditions of light, air, temperature and pressure and during purification of the crude nitrile monomer. To inhibit polymer formation during distillation of the unsaturated nitrile, the inhibitors can be added to the feed stream to the column or introduced separately at some point in the distillation column. Preferably the inhibitors are introduced at the top of the column to provide mass inhibition throughout the entire system.

Any dialkyl or trialkyl amine can be used in the practice of this invention. Dialkyl and trialkyl amines wherein the alkyl groups contain from 1 to 8 carbon atoms are particularly preferred. The alkyl groups can be unsubstituted or contain one or more substituents that are inert under the stabilizing conditions employed. The alpha, beta-unsaturated nitriles, represented by the formula

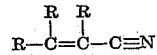

wherein the R's are the same or different and selected from the group consisting of hydrogen and alkyl radicals containing from one to eight carbon atoms, respond readily to the stabilizing effect of the inhibitor disclosed herein. Acrylonitrile, alpha-substituted acrylonitriles wherein the substituent on the alpha carbon atom is an alkyl radical containing from 1 to 8 carbon atoms, and beta-substituted acrylonitriles wherein the substituent on the beta carbon atom is an alkyl radical containing from 1 to 8 carbon atoms, represent a class of monomers which polymerize very readily, but can be most effectively inhibited against polymerization by means of the inhibitors of this invention.

When desired, the inhibitors of this invention can be removed from the stabilized unsaturated nitrile monomer by any technique well-known to those skilled in the art. This can conveniently be accomplished by distillation.

The novel compositions of this invention can be used to effect storage of the unsaturated nitrile for extended periods of time thereby permitting its conventional use at a much later date without the need for extensive purification.

What is claimed is:

1. A composition comprising an alpha, beta-unsaturated nitrile containing a minor amount of at least 0.5 part by weight of an amine selected from a group consisting of dialkyl amines and trialkyl amines per million parts by weight of nitrile and a minor amount of at least 10 parts by weight of acetaldehyde per million parts by weight of nitrile.

2. A composition comprising a nitrile selected from the group consisting of acrylonitrile, the alpha-substituted acrylonitrile wherein the substituent on the alpha carbon atom is an alkyl radical containing from 1 to 8 carbon atoms, and the beta-substituted acrylonitriles wherein the substituent on the beta carbon atom is an alkyl radical containing from 1 to 8 carbon atoms, containing a minor amount of at least 0.5 part by weight of an amine selected from the group consisting of dialkyl amines and trialkyl amines per million parts by weight of nitrile and a minor amount of at least 10 parts by weight of acetaldehyde per million parts by weight of the nitrile.

3. A composition comprising acrylonitrile containing a minor amount of at least 0.5 part by weight of an amine selected from the group consisting of dialkyl amines and trialkyl amines wherein the alkyl groups contain from 1 to 8 carbon atoms per million parts by weight of acrylonitrile and a minor amount of at least 10 parts by weight of acetaldehyde per million parts by weight of acrylonitrile.

4. A composition comprising acrylonitrile, from about 0.5 to about 1000 parts by weight of di-iso-propylamine per million parts by weight of acrylonitrile and from about 50 to about 100 parts by weight of acetaldehyde per million parts by weight of acrylonitrile.

5. A composition comprising acrylonitrile, from about 0.5 to about 1000 parts by weight of tri-n-butylamine per million parts by weight of acrylonitrile and from about 50 to about 100 parts by weight of acetaldehyde per million parts by weight of acrylonitrile.

6. A composition comprising acrylonitrile, from about 0.5 to about 1000 parts by weight of diethylamine per million parts by weight of nitrile and from about 50 to about 100 parts by weight of acetaldehyde per million parts by weight of acrylonitrile.

7. A composition comprising acrylonitrile, from about 0.5 to about 1000 parts by weight of triethylamine per million parts by weight of nitrile and from about 50 to about 100 parts by weight of acetaldehyde per million parts by weight of acrylonitrile.

References Cited in the file of this patent
UNITED STATES PATENTS
2,609,387  Basdekis et al. _____ Sept. 2, 1952